Jan. 1, 1935.  H. HARDINGE  1,986,573
LIQUID CLARIFIER AND THICKENER
Filed Feb. 5, 1931   8 Sheets-Sheet 1

Inventor
Harlowe Hardinge
By his Attorneys
Cooper, Kerr and Dunham

Jan. 1, 1935.  H. HARDINGE  1,986,573
LIQUID CLARIFIER AND THICKENER
Filed Feb. 5, 1931  8 Sheets-Sheet 2

Jan. 1, 1935.  H. HARDINGE  1,986,573
LIQUID CLARIFIER AND THICKENER
Filed Feb. 5, 1931   8 Sheets-Sheet 4

Jan. 1, 1935.  H. HARDINGE  1,986,573
LIQUID CLARIFIER AND THICKENER
Filed Feb. 5, 1931  8 Sheets-Sheet 6

Inventor
Harlowe Hardinge
By his Attorneys
Cooper, Kerr and Dunham

Jan. 1, 1935.  H. HARDINGE  1,986,573
LIQUID CLARIFIER AND THICKENER
Filed Feb. 5, 1931   8 Sheets-Sheet 7

Inventor
Harlowe Hardinge
By his Attorneys
Cooper, Kerr and Dunham

Jan. 1, 1935.  H. HARDINGE  1,986,573
LIQUID CLARIFIER AND THICKENER
Filed Feb. 5, 1931   8 Sheets-Sheet 8

Fig. 18

Patented Jan. 1, 1935

1,986,573

UNITED STATES PATENT OFFICE 1,986,573

LIQUID CLARIFIER AND THICKENER

Harlowe Hardinge, York, Pa., assignor to Hardinge Company, Incorporated, York, Pa., a corporation of New York Application February 5, 1931, Serial No. 513,557

19 Claims. (Cl. 210—55)

This invention relates to liquid clarifiers and thickeners, and more particularly to devices of that nature in which it is sought to remove from a liquid suspended or other undissolved material that may be caused to collect at the bottom of a tank containing the liquid, or at the surface of the latter; or in which it is sought to reduce substantially the liquid content of suspensions or other mixtures of liquid and solid material by separating, for example, the relatively dense sludge which may collect at the bottom of a vessel containing such a mixture. Apparatus of this character finds wide commercial application, especially in the field of sanitation and sewerage, and in the various chemical and metallurgical industries. In the grinding or other treatment of ore, for example, sedimentation tanks of the type described may be employed for the removal of clear water from mixtures of the latter with the pulverized or granulated ore. Likewise, in sewage disposal systems, clarification tank devices may be used to remove from the sewage or other effluvium not only the heavier undissolved material which settles to the bottom but also, in many cases, lighter or more finely divided substances that rise and form a scum at the surface. Other uses for sedimentation tanks and the like include various processes involving the settling of precipitated material and decanting of clear liquid away from the same; in the manufacture of paper, for instance, such apparatus is of utility in removing pulp from the so-called "white water", which, drained from the treated pulp, contains fine particles of the latter in suspension.

In using clarifiers commercially, it is often desirable to handle large quantities of liquid in a single tank, and for economy of space, sedimentation tanks of substantially rectangular plan are highly advantageous. They are, moreover, easily constructed in such shape, and especially when of a large area, are of further value in avoiding undue agitation of the liquid. In employing clarifiers of the sort described, wherein for example sludge or other material collects at the bottom of the tank, it is desirable that the removal of same be automatic, and although apparatus in which sludge is periodically removed in more or less discreet quantities, as by scraping it across the floor of a tank, is of considerable value, it is also desirable in many cases to obtain a substantially continuous discharge of sludge or other thickened suspension of settled substances.

Accordingly, it is among the objects of the present invention to provide a clarifier, thickener or the like, of the class stated, which may be automatic in operation and which, having a tank with a bottom of substantially rectangular plan, may serve efficiently to remove sludge or the like from the tank at any desired uniform rate of discharge; and to provide a so-called rectangular clarifier which has sludge scraping means operable so that each portion of the tank bottom is scraped in one direction only, and which may automatically and efficiently produce a substantially continuous discharge of sludge; and to provide such a clarifier, in which satisfactory removal of sludge from the ends of the tank floor is insured, and further to provide sludge-collecting clarifiers which may also have automatic scum-removing means capable of thoroughly skimming or sweeping the liquid surface. To these and other ends the invention comprises the novel features and combinations hereinafter described.

In the accompanying drawings, one form of rectangular liquid clarifier embodying the invention is illustrated in Figs. 1 to 10, inclusive, in which:

Another form of rectangular clarifier embodying the invention is illustrated in Figs. 11 to 18 inclusive, in which:

Fig. 14 is an enlarged view of the lower end of the suction conduit and part of the scrapers, illustrated in Fig. 11.

Fig. 15 is a vertical section on line 15—15 of

Fig. 14, showing an adjacent portion of the tank.

Fig. 16 is a section on line 16—16 of Fig. 15.

Fig. 17 is a perspective view of an end of the tank, with an end wall removed.

Figure 1:
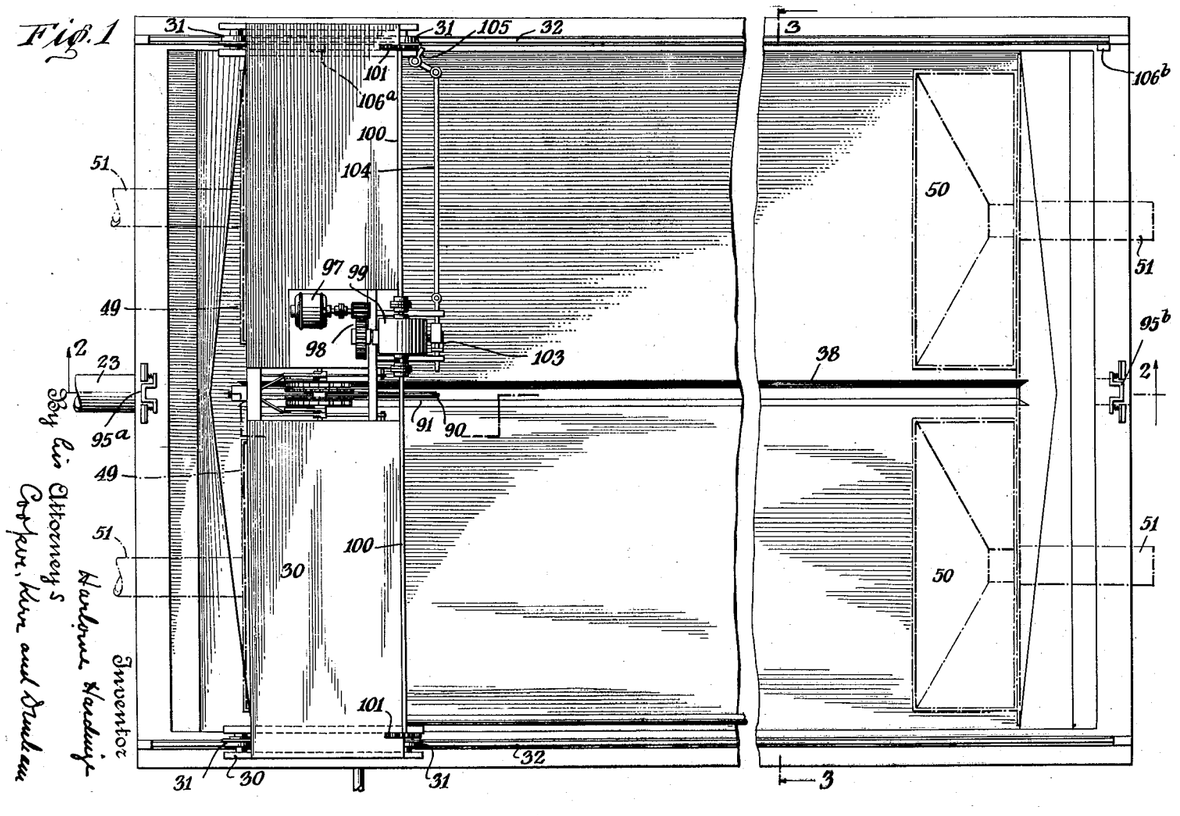
Fig. 1 is a plan view of the clarifier.
Figure 2:
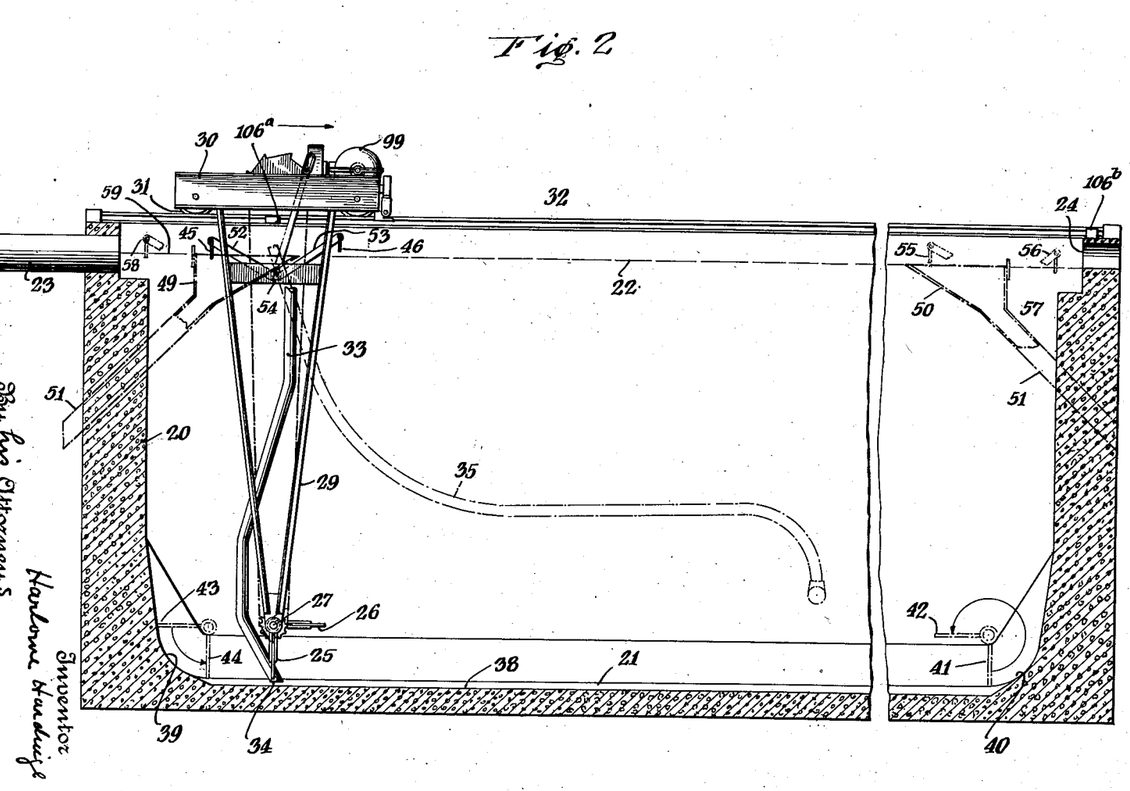
Fig. 2 is a longitudinal elevation showing a side view of the scraper carriage and mechanism, and the tank in section on line 2—2 of Fig. 1.

The clarifier embodying the invention as illustrated in Figs. 1 through 10, has a settling tank such as tank 20 in Fig. 2, into and through which the sewage, ore suspension, or other liquid mixture containing solid substances may be continuously or intermittently passed, so that the solid substances may settle to the bottom 21 as sludge or the like, or rise to the surface 22 as a scum. Suitable means for the ingress and egress of the liquid mixture may be provided, such as inlet pipe 23 and outlet port 24, or overflow weir at opposite ends of the tank, as shown, or elsewhere as desired.

To remove the sludge or the like which settles out of the liquid passing into and through the tank, scrapers 25, 26 are provided (see Figs. 2 and 3), disposed transversely of the tank, and capable of scraping along the floor of the latter; in the specific embodiment illustrated these scrapers 25, 26 are mounted on rotatable transverse shafts 27, 28 respectively, whereby the scrapers may be displaced out of operative position when and if desired. While two such scrapers are illustrated, it will be understood that a single scraper, or any convenient number of scrapers suitably cooperating, may be employed, with appropriate modifications of, for instance, such attendant mechanism as is described below. It is understood, moreover, that in some cases desirable removal of sludge may be effected by setting one or more blades at any angle to the tank walls-facing, say the withdrawal pipe—rather than perpendicular to the latter as shown.

The scrapers and their mounting shafts may be supported by suitable frame-work 29 or the like, having means for moving the scrapers along the tank floor. Such means may desirably take the form of carriage 30, from which framework 29 is suspended, the carriage having wheels 31, capable of traveling on rails 32, conveniently disposed along the sides of the tank, as shown in Fig. 1. Withdrawal of sludge or thickened liquid including the settled substances scraped along by the blades may be accomplished in several ways, among which one or more suction devices such as suction pipe 33, having an open end 34 adjacent the bottom of the tank, will operate advantageously. Suitable means for applying suction to the pipe, and for conveying the withdrawn sludge or other material away from the tank are provided; in the present embodiment, the pipe 33, being supported by framework 29 (see Fig. 3), may be coupled to a withdrawal member such as flexible hose or pipe 35, in turn connected through pipe 36 to pump 37, which may operate continuously.

Figure 3:
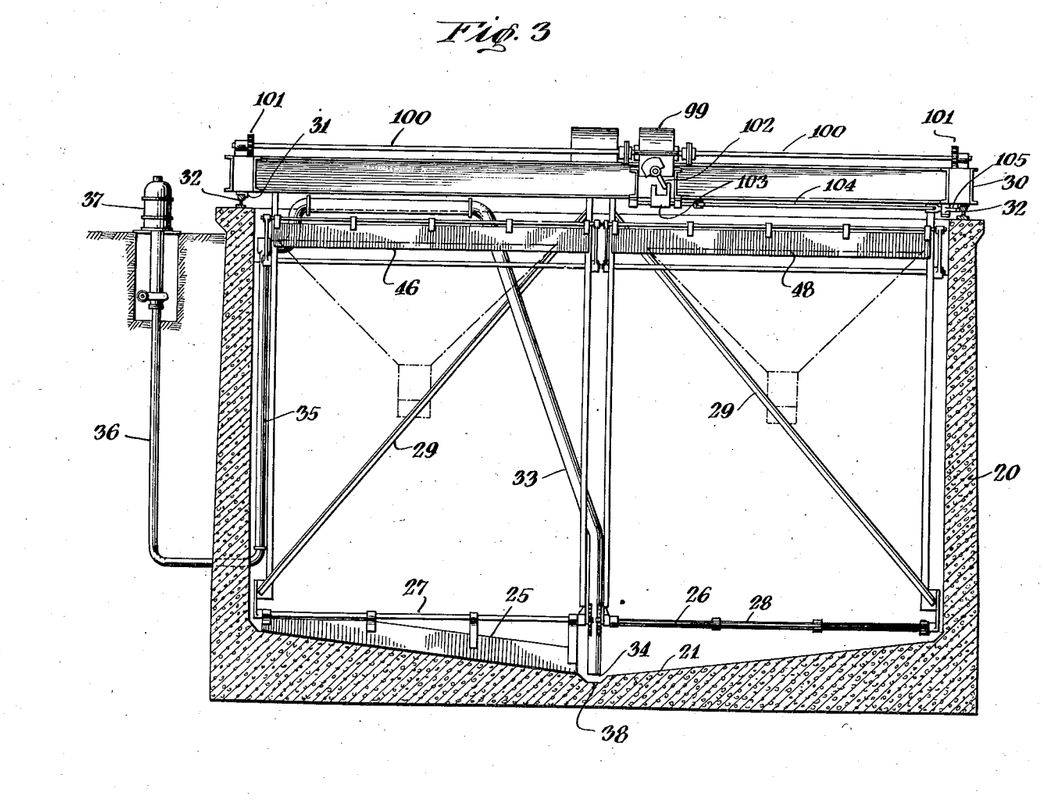
Fig. 3 is a transverse sectional view on line 3—3 of Fig. 1.

The lower open end 34 of pipe 33 is disposed adjacent the scraper blades, and may be conveniently positioned, for example, intermediate the two blades of the present embodiment, the adjacent ends of the blades being spaced apart for that purpose (see Fig. 3). It will now be seen that as blade 25, for instance, scrapes across the bottom of the tank, it scrapes up and dislodges the sludge or other particles of material settled there, constantly tending to pile up the material ahead of it, so that pipe 33, traveling with the blade, may continuously suck up and withdraw readily the settled material, together, of course, with a relatively small amount of liquid. To further enhance the withdrawal of material, the tank floor may conveniently be made to slope toward the path followed by the pipe-end 34, and to the same end, if desired, a shallow trough 38 may also be provided along the said path, running longitudinally of the tank floor, as in Figs. 1 and 3.

In order that the discharge of sludge or thickened liquid through piping 33—35—36 may be of substantially constant density, during the travel of the scraping means across the floor, the said means may be so constructed as to be operative during its travel in one direction only. Thus for instance, blade 25 being mounted on shaft 27 rotatable on suitable bearings in framework 29, may be down in working position when the carriage 30 is traveling from left to right of the tank, as shown in Fig. 2, and rotated to a horizontal non-scraping position for the return trip from right to left. In this way the time between successive working passages of the scraper, during which sludge may settle, is the same for all points on the tank floor, and any desired uniform rate of discharge of sludge from the tank may be obtained, the particular rate of discharge depending, of course, upon the speed of travel of the scraper and the pumping capacity being utilized.

While for many purposes sludge may be satisfactorily removed if it is withdrawn during travel of the carriage only on trips in one direction of the tank, a substantially continuous discharge of sludge is also advantageous in rectangular clarifiers. Such a continuous constant-density discharge may be obtained, for example, by having the scraper and withdrawal means operative over one portion of the tank floor during travel of the carriage in one direction, and over another portion during travel in the opposite direction. To that end, in the embodiment of Figs. 1 through 10, there are provided two scraper blades, rotatably mounted as hereinabove described, which may conveniently be operated so that when the carriage travels from left to right as in Fig. 2, blade 25, say, is down and scraping across one half of the floor (being the lower half as seen in the plan view of Fig. 1) while blade 26 is up out of working position, and when the carriage makes its return trip blade 26 is correspondingly down (scraping the upper half of the floor of Fig. 1) while blade 25 is up.

It is further desirable, in a rectangular clarifier of the type described, to provide means for clearing the ends of the tank, i. e., for removing sludge or other substances settled at the corners formed by the intersection of the floors with the end walls of the tank. Among other means, a convenient arrangement for thus clearing the corners comprises the provision of suitably shaped corners such as the corners 39, 40 (Fig. 2), rounded in 90° arcs, and the use of scraper means capable of operating over the rounded portions. In the present clarifier, for instance, blades 25, 26 are capable of complete rotation about the axes of their shafts; referring to Fig. 2, it is seen that as the carriage travels from left to right, the near blade 25 is down in scraping position, and on reaching corner 40, occupies position 41. The blade may then be rotated counter-clockwise to a non-operative position, so that it scrapes sludge from rounded corner 40 and may dump the same to the left of position 41, where it may slide or be sucked across the sloping tank floor for withdrawal by suction pipe 33. Conveniently, the rotation may be through an arc of 270°, to horizontal position 42, since in the latter the blade may offer least resistance and cause least undue agitation of liquid during its return trip from right to left. At the end of such trip, the blade reaches position 43, and may then be further rotated counter-clockwise through an angle, say, of 90° to position 44, so that sludge is scraped from rounded corner 39 for removal by pipe 33 and the blade is ready for its succeeding trip from left to right.

If it is desired, as in the present embodiment, that another scraper such as blade 26 be operative only during the trip from right to left, clearing of corners at the ends of its path may be accomplished by similar rotation. This may, for example, be a rotation clockwise as viewed in Fig. 2, through an angle of 90° at corner 40 (the end of the non-operative trip of blade 26) and through a further angle of 270° at corner 39, the directions of travel and rotation being the reverse of those of blade 25, and sludge being similarly cleared from the corners, as will now be readily understood.

The clarifier carriage may also be provided with one or more blades, fixed or movable by tilting or the like, and capable of skimming or sweeping the surface 22 of the liquid to collect scum or other layer of floating substances for removal, as for example by troughs which may be conveniently disposed at the ends of the tank. In the device shown, these may be advantageously two pairs of blades 45, 46 and 47, 48 (see Figs. 2, 3, 4 and 6), each pair being capable of skimming along a path on the surface directly above the path on the bottom followed by one of the scraper blades 25, 26. Scum-withdrawing devices such as open troughs 49, 49 and 50, 50, having withdrawal pipes 51, may be provided, and advantageously disposed at opposite ends of the tank (Figs. 1 and 2). Referring to Fig. 2, the near pair of blades 45, 46 may be carried respectively by arms 52, 53 secured to a shaft 54 rotatably mounted on framework 29, the arms thus being adapted to rock so that the blades may be alternately disposed up away from the liquid surface 22, as blade 46 in the drawing, or down in operative position with the lower edge just touching, or just above, or advantageously slightly below the liquid surface, as blade 45 in the drawing. With the withdrawal troughs disposed as shown, the blades may conveniently be operated as follows: as the carriage moves from left to right, blade 45 is down, scraping scum across the surface 22 into trough 50, and at the end of the trip occupies position 55. The arms 52, 53 may then be rocked, lifting blade 45 and placing blade 46 in operative position. Blade 46, thus starting in position 56, follows the return trip of the carriage: it first scrapes scum from portion 57 of liquid surface into trough 50, and then scrapes over the central part of the surface, depositing the collected substances in trough 49. When the carriage reaches the left-hand end of the tank, the arms may again be rocked, and blade 45, again down in scraping position as at 58, will scrape first, surface portion 59 into trough 49, and then the remaining surface into trough 50. Blades 47 and 48, traveling over the other half of the tank, not seen in Fig. 2, may advantageously be operated simultaneously and in the same directions and manner as the blades described. In order that the lower ends of the blades may pass over the edges of the troughs, when scraping into the latter, the blades may desirably be hinged or otherwise pivotally mounted, so as to swing free, at the ends of arms 52, 53. As hereinabove explained, other skimmer arrangements may be employed, such as a blade or set of blades operative to remove scum on travel of the carriage in one direction only; such a device, for example, may be made by dispensing with blade 46 (and blade 48) and troughs 49, in the apparatus shown.

Figures 4, 6:
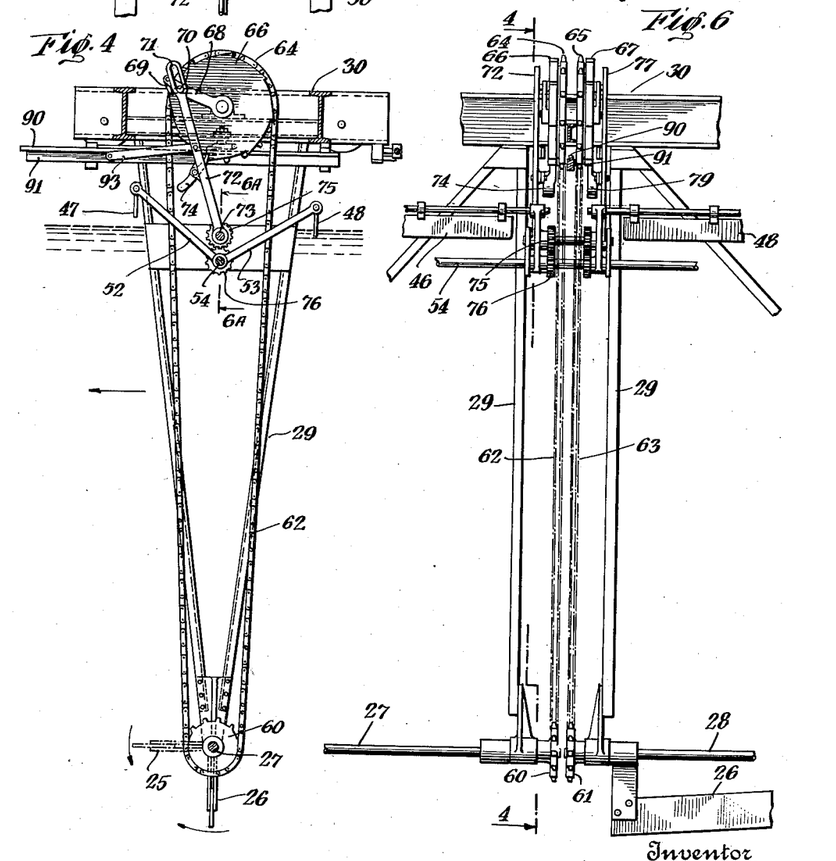
Fig. 4 is a side view of the scraper and skimmer mechanism, showing the carriage partly in section.
Fig. 6 is an endwise view of the mechanism shown in Fig. 4, seen as from the right in the latter figure.

In order that the clarifier may operate to greatest advantage in many respects, and the continuous removal of sludge, and scum as well, be facilitated, means may be provided for automatically placing the several sludge-scraper blades, and likewise the skimmers, in or out of operative condition as desired according to the direction of travel of the supporting carriage. A convenient mechanism for accomplishing rotation of scraper blades and rocking of skimmer arms in the present embodiment is shown in Figs. 4 through 10. Referring to Figs. 4 and 6 (Fig. 4 being a section on line 4—4 of Fig. 6), which show the mechanism with skimmers and scrapers in position reversed to that shown in Fig. 2 and thus appropriate for travel from right to left: Rotatable scraper shafts 27, 28, carry respectively at their inner adjacent ends small sprocket wheels 60, 61, operable—to rotate the scrapers—by suitable chains or belts 62, 63 respectively, passing over and driven by large sprocket wheels 64, 65, the large and small sprocket wheels having any convenient diameter ratio, for example, one such that a half revolution of wheel 64 will rotate the wheel 60 through a full revolution.

Sprocket wheels 64, 65, each mounted on a suitable shaft journaled in the frame of carriage 30, conveniently as shown, are respectively secured to ratchet wheels 66, 67, mounted on the same shafts. An arm 68, rotatable about the shaft of ratchet wheel 66, carries at its outer end a pawl 69 engaging the teeth of that wheel, which are, for instance, so faced that the pawl may drive the wheel in a counterclockwise direction as viewed in Fig. 4. A pin 70 carried by arm 68 near its outer extremity engages a slot 71 which extends lengthwise of a lever 72 at the end thereof, the lever 72 being conveniently pivoted at its other end about a bearing 73 at a suitable point on framework 29 below the carriage, and being thus capable of rotation or rocking in a plane parallel to the face of ratchet wheel 66, and so to cause rotation of arm 68. At a suitable point intermediate its ends lever 72 carries a second pawl 74 also engaging the ratchet wheel and capable of rotating same in a counterclockwise direction. The positions and dimensions of lever 72, arm 68, and pawls 69 and 74 may conveniently be such that as the lever is rocked from a position at the left, as shown, to a corresponding position at the right, it will cause pawl 74 to rotate wheel 64 counterclockwise 45°, while on being rocked back from right to left, to its original position, the lever, through cooperation of slot 71, pin 70 and arm 68, will cause pawl 69 to further rotate wheel 64 counterclockwise 135°. Remembering that rotation of ratchet wheel 66 also rotates sprocket wheel 64, and that the latter bears a 2:1 diameter ratio to the scraper-rotating wheel 60 which it drives, it will now be understood: that as lever 72 is rocked from left to right, scraper blade 25 will be rotated from its position of Fig. 4 counterclockwise 90° to its position of Fig. 2; that as the lever is rocked back from right to left, the blade 25 will further rotate in the same direction 270° back to its position of Fig. 4 (being positions 42 or 43 of Fig. 2); and that as the lever is repeatedly rocked back and forth, the scraper blade may thus be continuously rotated assuming alternately the desirable operative and non-operative positions hereinabove described.

In order, if desired, to accomplish rocking of skimmer blades, as for purposes noted hereinabove, there may be secured to lever 72, at its lower end about bearing 73, a suitable gear 75 engaging a similar gear 76 secured to shaft 54, which latter carries skimmer arms 52, 53 (corresponding blades 45, 46 not being seen in Fig. 4, but similarly operated blades 47, 48 appear behind the arms 52, 53). The said arms may be so disposed that by reason of the gearing described, as lever 72 is rocked from left to right, they are rocked counterclockwise from the position of Fig. 4, where arm 53 has its corresponding blade in operative position, to the position of Fig. 2, where blade 45 of arm 52 is down in skimming position; where as reverse rocking of the lever will return the blades to the position of Fig. 4. It will now be understood that according as lever 72 is in its left- or right-hand position, not only skimmer blades 45, 46, but also scraper blade 25, are placed in position for respectively leftward or rightward travel of carriage 30, as shown in Fig. 2.

Figure 5:
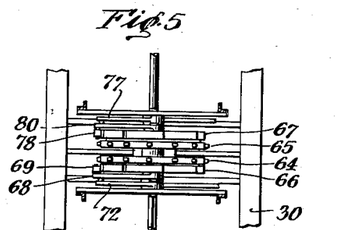
Fig. 5 is a plan view of part of the mechanism shown in Fig. 4.
Figure 6A:
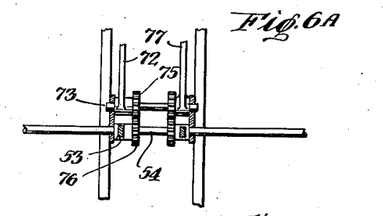
Fig. 6A is an end view of part of the mechanism of Fig. 4, being a section on line 6A—6A of the latter.
Figures 7, 8, 9:
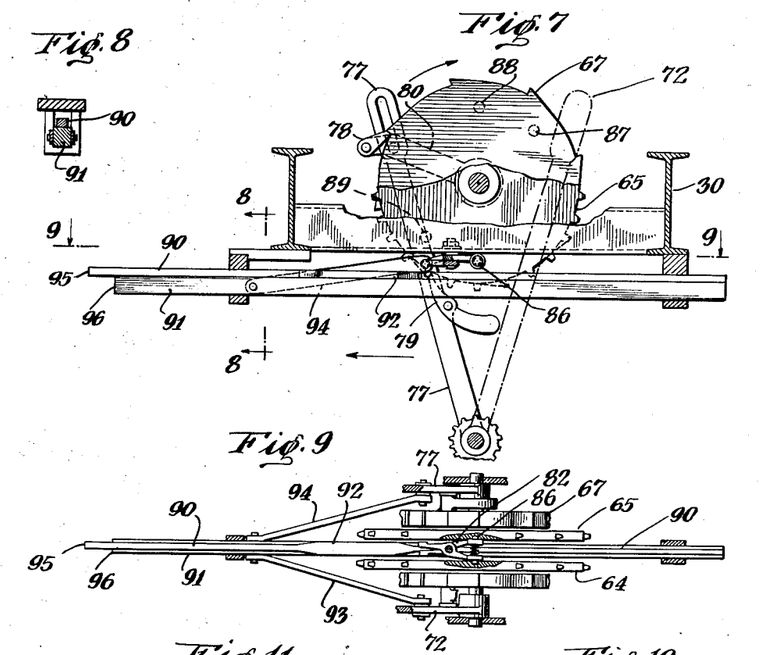
Fig. 7 is an enlarged side view of part of the mechanism of Fig. 4, partly in section and with certain portions cut away.
Fig. 8 is a section on line 8—8 of Fig. 7.
Fig. 9 is a plan view of the mechanism of Fig. 7, partly in section on line 9—9 of Fig. 7.

Rotation of scraper blade 26, as well as appropriate tilting of skimmers 47, 48, may be accomplished by a similar lever 77 capable of actuating pawls 78 (on arm 80) and 79 cooperating with ratchet wheel 67, conveniently in a manner similar to that in which lever 72 cooperates with wheel 66, the lever 77 being also geared to rock appropriate arms supporting skimmer blades 47, 48 simultaneously with arms 52, 53 (see Figs. 5, 6 and 6A). If desired, as in the specific clarifier shown, that scraper blade 26 be operative only when blade 25 is up out of scraping position, and vice versa, the pawls 78, 79 and cooperating teeth of ratchet wheel 67 may be such that the direction of rotation of the latter is opposite to that of wheel 66. Such construction is shown in detail in Fig. 7, showing ratchet wheel 67 as viewed from the left in Fig. 6, with sprocket wheel 65 partly cut away, and showing also, in outline 81, the position taken by lever 77 on being rocked to the right. It will now be appreciated that if lever 77 be rocked back and forth in the same manner as lever 72, blade 26 will be continuously rotated in a clockwise direction, (by wheel 65, chain 63, and wheel 61) as seen for example, in Fig. 4 where blades 25 and 26 have the respective positions corresponding to the levers being at the left; and that the scraping and corner-cleaning operations of blade 26 will bear the advantageous relation to those of blade 25 hereinabove described in reference to Fig. 2.

The blade-rotating and tilting means may also include an arrangement for automatically operating such mechanism as that of the character described above, at a given point or time during travel of the carriage along the tank. Among others, such arrangement may conveniently comprise means adapted, for example, to rock levers 72 and 77 automatically from one position to the other, on the arrival of carriage 30 at the end of the tank. A suitable form of such means is shown in Figs. 4, and 7 through 10. Supported by the carriage frame at a point conveniently intermediate sprocket wheels 64, 65, there may be provided a pair of pivoted jaws 82, having at one end downwardly-extending gripping portions 83 and at the other end outwardly-extending buttons 84, the latter being urged outwardly and the gripping portions inwardly by a spring 85 between the button-carrying ends. The sprocket wheels may be provided with holes or depressions, such as holes 86, 87, 88, 89 in wheel 65 as marked in Fig. 7, capable of being engaged by buttons 84. These holes may conveniently be disposed so that as the wheels 64 and 65 reach successive positions in their rotation corresponding to the predetermined left- or right-hand positions taken by levers 72 and 77, the buttons 84 will be respectively engaged by holes in the two wheels, as in Fig. 9. In this fashion means may be provided both for arresting and locking the said wheels and attendant scraper and skimmer mechanisms at the desired points in their respective operative cycles.

Extending lengthwise along the carriage in the direction of its travel and conveniently below jaws 82 so as to be engaged by the gripping portions 83 thereof, a guide strip 90 is provided. A second guide strip 91 is also provided, slightly shorter than the first and, conveniently disposed below it, and the two strips may be longitudinally slidable with respect to the carriage and each other. The strip 90 has a widened portion 92, with wedge-shaped ends, such that upon the strip being slid along between the jaw portions 83 (as, say, to the right in Fig. 9), the latter will be spread apart by the portion 92 and the buttons 84 will be correspondingly retracted from engagement with holes in wheels 64, 65. Links 93, 94, pivoted at each end, extend from strip 91 to levers 72 and 77 respectively, the pivots on the strip and levers being suitably located so that as the strip is slid lengthwise, the levers will be rocked in the manner indicated. It will now be understood that with the parts in position as shown in Figs. 7 and 9, suitable for example for travel of the carriage toward the left,—end 95 of strip 90 projecting somewhat ahead of end 96 of strip 91,—travel of the carriage leftward may bring the strip end 95 against the end wall of the tank or a suitable stop 95a thereat (see Fig. 1) whereupon further travel leftward will slide strip 90 back, opening jaws 82 to release buttons 84 and unlock the sprocket wheels, and pushing end 95 back flush with strip end 96, the latter striking the stop 95a. Still further leftward travel of the carriage then slides strip 91 back, pushing links 93, 94 to rock levers 72, 77 to the right. Meanwhile, the widened part 92 of strip 90 is being slid through jaws 82, holding the latter in non-locking position, and the proportions of the parts may desirably be such that the links complete the rocking of the levers to the right-hand position of the latter just as or just after jaw portions 83 reach the left end of widened portion 92, where re-locking of the mechanism occurs (one of buttons 84, for example, then engaging hole 87 in disc 65). The parts are now in position for travel to the right, with the guide strips projecting in that direction and the end of strip 90 advanced somewhat ahead of the end of strip 91, so that on reaching the right-hand end of the tank, both strips may be pushed back to again unlock jaws 82, rock levers 72 and 77 to the left and relock the mechanism, as will now be understood.

Driving means for propelling the carriage 30 back and forth across the tank so that the various sludge- and scum-removing devices may operate advantageously, as in the manner indicated, may be provided, and one form of such means may conveniently be carried by the carriage and may include as shown in Fig. 1 driving motor 97, coupled to reducing gears 98 and reversing clutch 99, these parts being of any suitable construction. Drive shafts 100 may conveniently extend transversely across the carriage out from the clutch 99, having at their outer ends gears 101 for driving the wheels 31 of the carriage. There may also be provided means for automatically shifting a reversing lever 102 (see Fig. 3), which the reversing clutch 99 may have for operating same, at given points in the travel of the carriage. Such means may include, for instance, jaws 103 engaging lever 102 and movable by linkage 104 extending across the carriage to one side thereof, the linkage in turn being operable, to move jaws 103, by means of a trip lever 105 capable of being rocked when the carriage brings it against stops such as stop 106a (Fig. 2) along the side of the tank. One of the stops may advantageously be positioned near each end of the tank, so disposed that reversal of the driving mechanism by shifting linkage 104 and clutch lever 102 will occur just as or just after the automatic scraper-rotating mechanism completes its cycle of operation when the carriage is at the end of the tank.

It will now be seen that the clarifier described may be operated continuously to remove sludge of substantially constant density at a substantially constant rate, and at the same time to thoroughly clear the liquid surface of scum. As the carriage 30 is driven from left to right (Figs. 1 and 2), blade 25 scrapes up sludge along one side of the tank, for withdrawal by pipe 33, while skimmers 45, 47 gather up scum into trough 50. On reaching the end of the tank, slides 90, 91 successively strike stop 95b, rocking the skimmer blades and rotating the scrapers, and trip lever 105 strikes stop 106b, reversing the driving mechanism. The carriage then travels back along the tank, scraper 26 removing sludge from the other side of the tank and blades 46, 48 skimming the surface, until the left-hand end is reached, where the strips and trip lever reach stops 95a and 106a respectively, the mechanism being again reversed, and the carriage again moves down the tank from left to right. In this fashion for example, the carriage may travel continuously back and forth, with the various clarifying or thickening devices operating advantageously in the manner described.

Another embodiment of the present invention comprises the clarifier or thickener illustrated in Figs. 11 through 18. In this specific arrangement, means for the substantially continuous removal of sludge from the bottom of a tank such as tank 107 may include a scraper blade 108 and cooperating withdrawal means such as suction pipe 109, the blade being capable of scraping down one side of the tank floor and back along the other side of the same while the dislodged or otherwise scraped-up sludge may be constantly withdrawn through the pipe 109. Sludge-removal means operable in this manner thus comprise it will now be seen, means for scraping each part of the tank floor in one direction only, so that a sludge discharge of substantially constant density may be obtained, as explained hereinabove, and also comprise means for producing a continuous discharge of that nature by having the scraping means operative over one part of the tank floor during travel in one direction and over another part of the floor during travel in the reverse direction.

One form of means for operating scraper 108 in the manner indicated may conveniently include (see Figs. 11, 12, 13) a main carriage 110 having wheels 111 traveling on rails 112 extending lengthwise along the sides of the tank, and a transverse carriage 113 having wheels 114 capable of travel on rails 115 carried by the main carriage and disposed on the latter in a direction crosswise of the tank. Blade 108 may be supported from carriage 113 in any suitable fashion, as by framework 116, which may also serve to support pipe 109, the latter having its lower end near the tank floor, conveniently at the center of the blade, as shown. Means for applying suction to pipe 109 and for conveying sludge therefrom may be provided, such for example as in the first described embodiment of the invention; another form of such means, capable of desirable operation in the present clarifier, may include a pump 117 coupled to the pipe 109 and a driving motor 118 for the pump, the pump and motor being carried by carriage 113. The outlet of the pump may be through a pipe 119, disposed so as to discharge sludge or the like into a trough or race 120 carried by carriage 110, the trough 120 being so arranged, conveniently as shown, as to be capable of continuously transferring the discharged sludge into a drain or trough 121 which may be disposed lengthwise along a side of the tank.

For the ingress and egress of liquids, the tank may be provided with suitable means, among other forms of which a desirable arrangement may comprise influent channel 122 and effluent channel 123, disposed respectively along opposite sides of the tank and communicating with the interior of the latter through a series of ports or slots 124.

Figure 12:
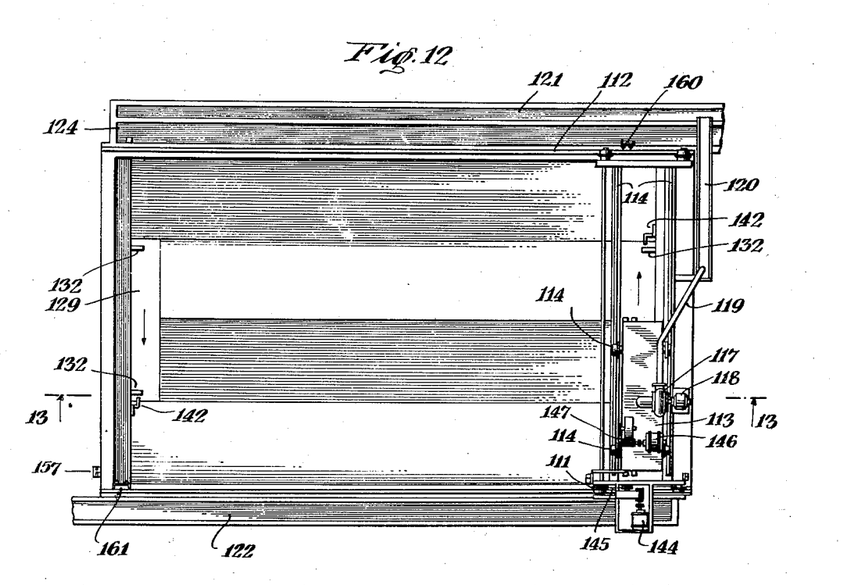
Fig. 12 is a plan view of the clarifier.
Figures 14, 15, 16, 17:
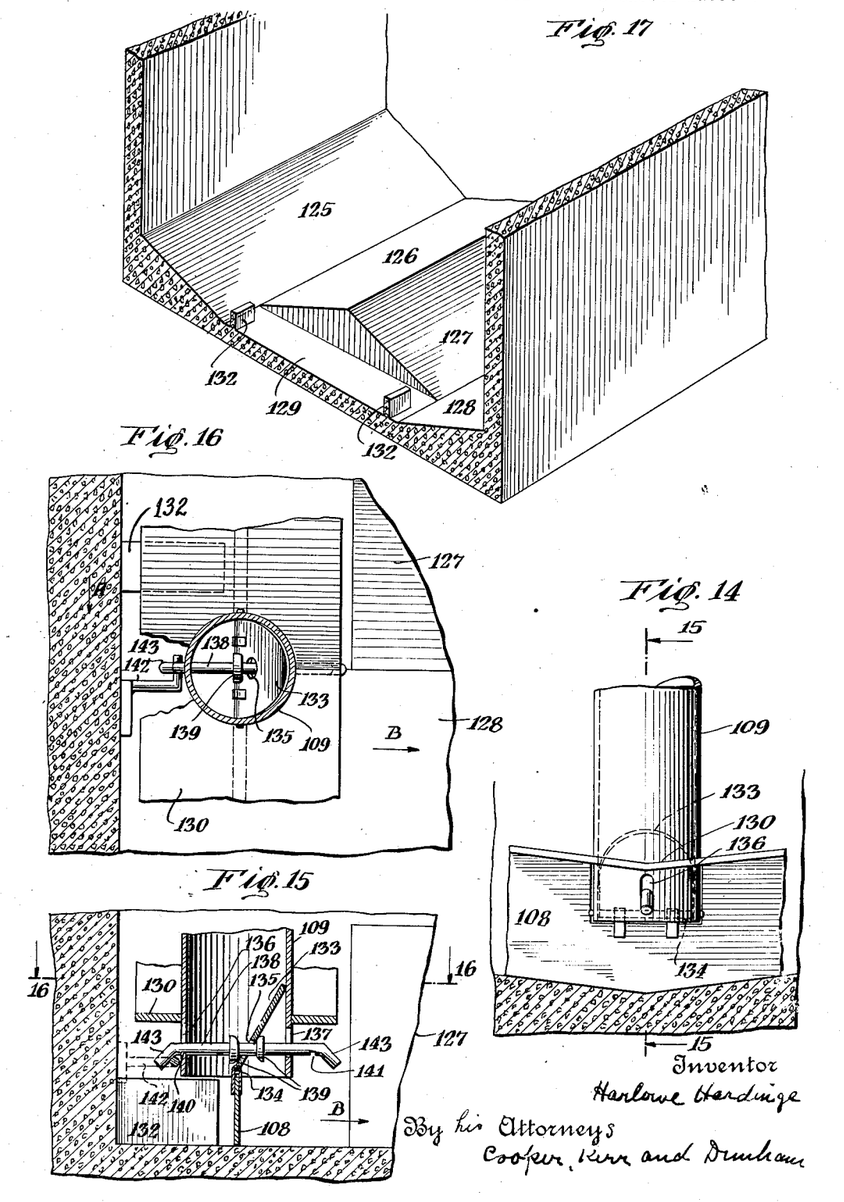

It is now seen that the arrangement of carriages 110 and 113 is such that scraper blade 108 may travel down the tank, as to the right, to the position of Fig. 12, on carriage 110 (scraping, say, that half of the tank floor in the lower part of Fig. 12), then be moved across the tank by appropriate travel of carriage 113, and make a return trip toward the left (as in Fig. 12, scraping the other half of the floor), and finally be moved back across the tank by carriage 113. In order to facilitate removal of sludge or the like in this manner, the tank floor may. if desired, have appropriate sloping portions along the lengthwise paths of the scraper, such for example as the faces 125, 126 forming a shallow trough comprising one path for scraper 108, and similar faces 127, 128, comprising another path. The blade 108 may have the shape of a shallow V as shown, to conform to the slopes of the floor (see Fig. 11), and for its crosswise trip at each end of the tank a path may be provided, such as level portion 129 as shown in Fig. 17.

Figures 10, 11:
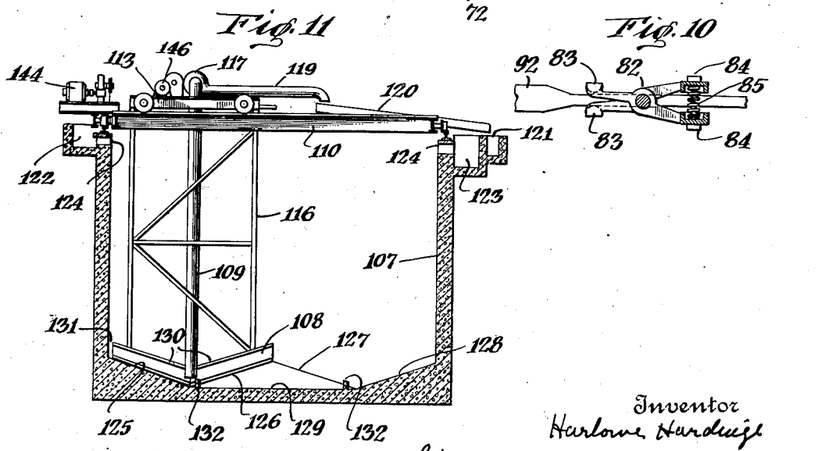
Fig. 10 is an enlarged plan view of part of the mechanism of Fig. 9.
Fig. 11 is a transverse view of the clarifier, showing an end elevation of the carriages and scrapers, and the tank in section.

Further means to facilitate the withdrawal of sludge or thickened liquid by a suction device such as pipe 109 may be employed, one form of such means being a horizontal cover 130 disposed along the upper edge of scraper blade 108 and of such proportions as to leave a small space, as at 131, between its outer extremity and the adjacent tank wall. Among other advantages of such arrangement, the suction exerted by pipe 109 is thereby concentrated over the tank floor adjacent the blade, not only for instance along face 126 (Fig. 11) but also, by reason of space 131, along face 125. As in the first-described embodiment of the invention, it is also desirable to have means for cleaning the corners between the floor and end walls. An arrangement of this sort advantageous for the present clarifier may include projections 132 disposed at the ends of the tank, as shown in Figs. 11 and 17, cooperating with the scraper parts when carriage 110 reaches an end of the tank. As seen in Fig. 11, blade 108, cover 130, floor space 125 and the end wall of the tank comprise in effect a suction conduit, whereby a strong current of liquid entering space 131 and deflected by projection 132 up into suction pipe 109 will result, with corresponding quick and thorough removal of sludge.

The operation of suction pipe 109 to remove sludge as scraped up by blade 108 may be further facilitated, if desired, by providing the lower end of the pipe with means whereby suction is exerted only on one side of the blade, such as the forward side of the latter in its travel. Such means may comprise, as shown in Figs. 14, 15, 16, a semi-circular valve plate 133, hinged at its lower straight edge 134 to a portion of the scraper blade below the end of the pipe, so that when tilted to right or left it closes the pipe on the corresponding side of the blade. Through a hole 135 in the plate and through vertical slots 136, 137 in the walls of the pipe extends a horizontal rod 138, perpendicular to the blade 108, having a pair of central flanges 139 adapted to engage the valve plate for tilting the same. The rod 138 may have locking notches or grooves 140, 141 as shown, capable of engaging the lower edge of slot 136 or slot 137 respectively when the plate 133 is tilted to left or right (see Fig. 15). In order to tilt plate 133, as may be desired, when the scraper has crossed an end of the tank and cleaned both sides of the corner at such end,—so that the pipe 109 may desirably withdraw sludge from the opposite side of the blade, ahead on the return trip along the tank,—at a suitable point on the end wall of the tank extends a hook or bracket 142 (see also Fig. 12), capable of engaging one of the downwardly extending camming portions 143 at the ends of rod 138 just as the scraper is brought to rest at the end of its travel in the direction of arrow A, Fig. 16. With the parts positioned as shown, the scraper may then begin to travel in direction of arrow B, whereupon hook 142, acting on portion 143, first cams rod 138 upwardly, unlocking it by raising notch 140 above the lower edge of slot 136. As the scraper travels on, hook 142 pulls rod 138 back, tilting the plate 133 to the left, and just as portion 143 is finally cammed free of the hook, the plate reaches its left-hand closing position and notch 141 drops on the edge of slot 137, relocking the parts. As will now be seen, these operations may be repeated in reverse direction as a similar hook at the opposite end of the tank is reached, and in this manner the valve means may be automatically operated at suitable predetermined points during the travel of the scraper carriages.

Figure 13:
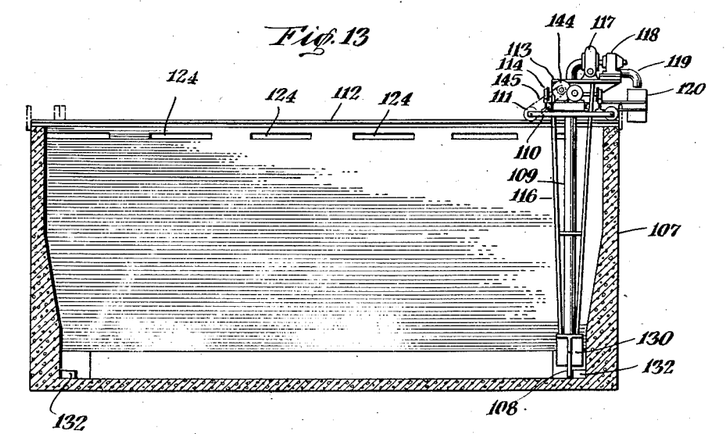
Fig. 13 is a longitudinal elevation showing a side view of the carriages and scrapers, and the tank in section on line 13—13 of Fig. 12.

Means for propelling carriage 110 along the tank may comprise an electric motor 144, having a driving chain 145 coupled to wheels 111, as shown in Figs. 12 and 13, and similarly carriage 113 may be propelled transversely of the tank on carriage 110, by a motor 146 having a driving chain 147 coupled to wheels 114. Automatic control of the driving means of the carriages may be achieved mechanically (as in the first-described embodiment) or electrically, a desirable arrangement for such control being that shown diagrammatically in Fig. 18. Power for the motors is distributed by wires 148 contacted by trolleys 149 on carriage 110, the said trolleys leading to distributing wires 150 along carriage 110, contacted in turn by trolleys 151 on carriage 113. Motor 144 is connected to trolleys 149 through a suitable relay or circuit-closer 152, capable, say, of successively stopping and reversing motor 144 on the operation of suitable push buttons from a distant point, and motor 146 is connected to trolleys 151 through a similar relay 153. At the opposite sides of carriage 110 are pairs of push buttons 154, 155 respectively adapted to be operated by stops 156, 157 at the ends of the tank, whereas carriage 113 has similar pairs of push buttons 158, 159 respectively operable by stops 160, 161 disposed at diagonally opposite points on the sides of the tank.

Figure 18:
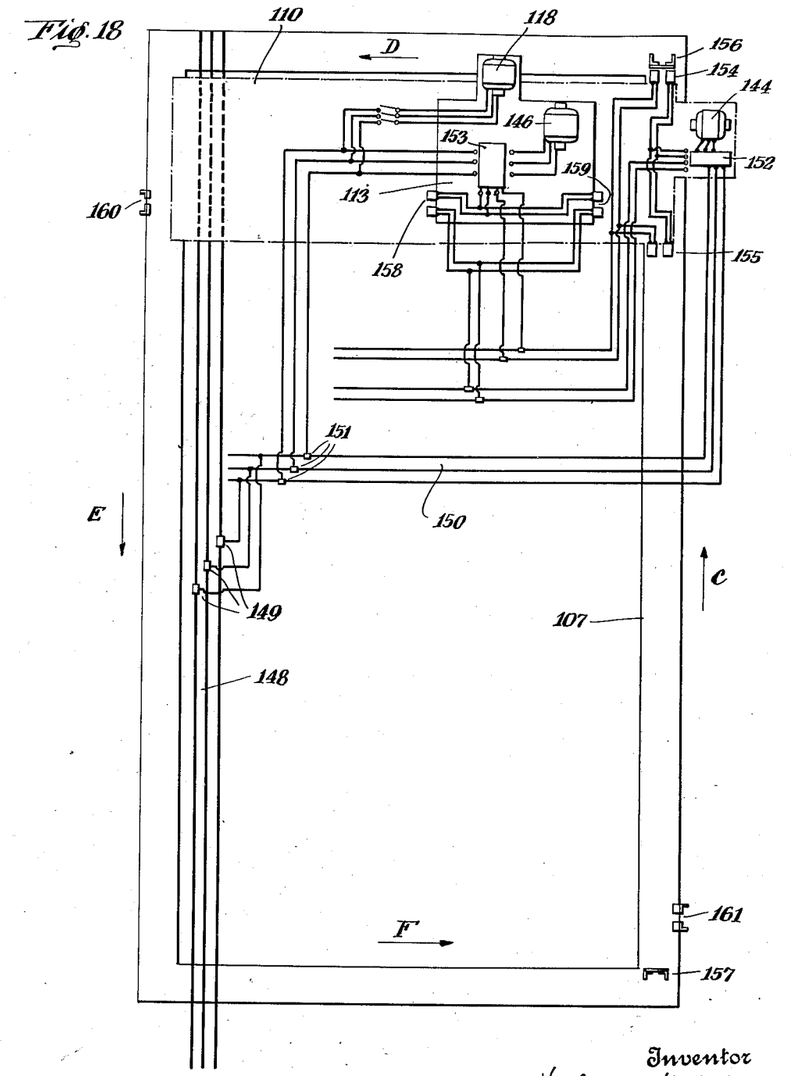
Fig. 18 is a diagrammatic plan view of the wiring for operating the carriages and pump of the clarifier.

The connections of the several push buttons and the relays 152, 153 may, as will now be understood, be conveniently such that their operation will be as follows: Carriage 110 travels down the tank in direction C until it reaches one end as shown in Fig. 18, where stop 156 engages push buttons 154 which shut off motor 144 (to stop carriage 110) and start motor 146 to drive carriage 113 across the tank in direction D. Stop 160 then engages push buttons 158, which cut out motor 146, and start up motor 144 in reverse to its previous direction, whereby carriage 110 travels back down the tank in direction E until stop 157 is struck by push buttons 155. Operation of the latter again stops motor 144, starting motor 146 in reverse to its previous direction, so that carriage 113 is driven back across the tank in direction F. Finally push buttons 159, actuated by striking stop 161, stop the motor 146 of carriage 113 and start up that of carriage 110 for renewed travel in direction C, whereupon the entire cycle may be repeated.

It will now be seen that as embodied in the apparatus of Figs. 11 through 18, the invention comprises a clarifier which may be operated continuously to remove sludge of substantially constant density at a substantially constant rate. In the present example, the scraping means is moved along the tank in one direction to remove sludge from one portion of the floor, then cleans the corner of one end and is moved laterally to position for travel back along the tank to remove sludge from another portion of the floor, and finally cleans the opposite corner and is shifted across for further travel in the original direction, the cycle being automatic and capable of automatic and continuous repetition as long as desired.

It is to be understood that the invention is not limited to the specific features and constructions herein described but can be embodied in other forms without departure from its spirit as defined by the following claims for example the outline, depth and proportion of the settling tank may be varied as required to suit any condition, the number and form of the scraper blades may be varied to suit varying conditions, and said blades may also be so constructed as to reduce the amount of resistance offered by the sludge during their movement therethrough, as by slots, perforations, or the like.

I claim:

1. A sedimentation device comprising a tank; a carriage movable back and forth along said tank and automatically reversible driving means for same; sludge-removing means, carried by said carriage, comprising sludge scraping means for the bottom of said tank and withdrawal means cooperating with said scraping means for substantially continuous withdrawal of sludge scraped up by the latter; and scraper-positioning means automatically controlled by the movement of said carriage for operating said sludge-removing means over one portion of the tank bottom during travel of the carriage in one direction and over another portion of the bottom during travel of the carriage in an opposite direction.

2. Apparatus for the separation of solid substances or the like from liquid mixtures of the same, comprising a tank, scraping means comprising one or more blades capable of scraping settled substances over the bottom of said tank, a carriage for said scraping means movable back and forth along the tank, a suction conduit associated with the scraping means for substantially continuous removal of settled substances, and means controllable by the movement of the carriage for variable positioning of the scraping means to operate same along a plurality of paths over the tank bottom in succession.

3. A sedimentation device comprising a tank, a carriage movable along the tank, sludge-scraping means for the bottom of the tank, withdrawal means for scraped-up sludge, and means controlled by the movement of the carriage for variable positioning of the scraping means to operate same along a plurality of paths over the tank bottom in succession.

4. A sedimentation device comprising a tank, a carriage movable back and forth along the tank, sludge removing means carried by the carriage comprising sludge-scraping means for the bottom of the tank and a suction conduit associated with the scraping means for substantially continuous withdrawal of sludge, and means controlled by the movement of the carriage for operating the sludge-removing means over one portion of the tank bottom during travel of the carriage in one direction and over another portion of the bottom during travel of the carriage in an opposite direction.

5. Apparatus for sedimentation and the like, comprising a tank, a carriage movable along the tank, driving means for the carriage, means for automatically reversing the direction of travel of the carriage at the ends of the tank, sludge-removing means carried by the carriage comprising sludge-scraping means for the bottom of the tank and a suction conduit associated with the scraping means for substantially continuous withdrawal of sludge, scraper-positioning means controlled by the movement of the carriage for operating the sludge-removing means over one portion of the tank bottom during travel of the carriage in one direction and over another portion of the bottom during travel of the carriage in another direction.

6. Apparatus for sedimentation and the like, as described in claim 11, in which the suction conduit has near the tank bottom a sludge-withdrawing open end capable of being moved in one or more paths by the travel of the carriage and in which the tank bottom has surfaces sloping toward said path or paths, the sludge-scraping means having a conformity with the said sloping surfaces.

7. In sedimentation apparatus and the like, in combination, a tank, one or more sludge-scrapers for the bottom of the tank, a carriage for moving the scrapers rectilinearly along the tank, said scrapers being pivotally mounted for rotation from operative to non-operative position and of further rotation in the same direction to operative position, and scraper-displacing means controlled by the movement of the carriage for successively rotating a scraper into operative position for travel of the carriage in one direction and into non-operative position for travel of the carriage in an opposite direction.

8. In sedimentation apparatus and the like, in combination, a tank, a pair of sludge-scrapers for the bottom of the tank, said scrapers being operable over respectively different portions of the tank bottom, a carriage for moving the scrapers rectilinearly along the tank, said scrapers being pivotally mounted for rotation from operative to non-operative position and of further rotation in the same direction to operative position, and scraper-positioning means controlled by the movement of the carriage for repeatedly rotating the scrapers to place one of same in operative position during travel of the carriage in one direction and the other scraper in operative position during travel of the carriage in an opposite direction.

9. In sedimentation apparatus and the like, in combination, a tank, one or more sludge-scrapers for the bottom of the tank, a carriage for moving the scrapers rectilinearly along the tank, said scrapers being pivotally mounted for rotation from operative to non-operative position and of further rotation in the same direction to operative position, and scraper-displacing means controlled by the movement of the carriage for successively rotating a scraper into operative position for travel of the carriage in one direction and into non-operative position for travel of the carriage in an opposite direction, the interior of said tank at the end corners of the tank bottom having a rounded configuration conforming with respective portions of the arcs followed by the scraper on being rotated at such corners, and the scraper-displacing means being capable of rotating the scraper at each corner through an arc sufficient to clear sludge therefrom.

10. In sedimentation apparatus and the like, in combination, a tank, sludge-scraping means for the bottom of the tank, a carriage for moving the scraping means back and forth along the tank, a sludge-withdrawal suction conduit movable with the carriage and having an open end near the tank bottom having access to both sides of the scraping means, shiftable valve means in said conduit for shutting off access of the open end to either side of the scraping means, and means controlled by the movement of the carriage for shifting the valve means.

11. In sedimentation apparatus and the like, in combination, a tank, a carriage movable lengthwise of the tank, sludge-scraping means operable rectilinearly over a portion of the tank bottom, scraper-positioning means comprising a second carriage associated with the first carriage and movable crosswise of the tank, the first carriage being capable of operating the scraping means lengthwise of the tank, and the second carriage being capable of moving the scraping means crosswise for operation of the latter lengthwise over one or another portion of the tank bottom, and a suction conduit having an open end adjacent the tank bottom and movable with the scraping means, the tank bottom having configurations at the end corners thereof comprising closure projections adjacent the ends of the paths followed by said conduit end, and said scraping means having a horizontally extending cover, whereby at the ends of the tank the corners of the tank and the scraping means cooperate with the suction conduit for cleaning sludge from said corners.

12. In sedimentation apparatus and the like, in combination, a tank, a carriage movable lengthwise of the tank, sludge-scraping means operable rectilinearly over a portion of the tank bottom, scraper-positioning means comprising a second carriage associated with the first carriage and movable crosswise of the tank at either end thereof, the first carriage being capable of operating the scraper means lengthwise of the tank, and the second carriage being capable of moving the scraping means crosswise for operation of the latter lengthwise over one or another portion of the tank bottom, reversible driving means for both of said carriages, and automatic controlling means associated with said scraper-positioning means and said first carriage for repeatedly moving the scraping means successively across one end of the tank, lengthwise of the tank over one portion of the tank bottom, across the opposite end of the tank, and back lengthwise of the tank over another portion of the bottom.

13. A device of the class described comprising, in combination, a tank having a bottom composed of a plurality of juxtaposed inclined sections with a trough common to each pair of said sections, a carriage movable back and forth over the tank, a plurality of sludge-scraping means carried by said carriage, each adapted for operative and inoperative movement over the inclined bottom sections whereby the sludge is scraped from only one section during movement of the carriage in one direction, and means controlled by the movement of the carriage for selectively positioning the sludge scraping means so that said sections are alternately scraped of sludge.

14. A device of the class described comprising, in combination, a tank having a bottom composed of a plurality of juxtaposed inclined sections with a trough common to each pair of sections for receiving the sludge scraped from said sections, a carriage movable back and forth over the tank, a plurality of sludge-scraping means carried by said carriage, each adapted for operative and inoperative movement over the inclined bottom sections whereby the sludge is scraped from only one section during movement of the carriage in one direction, and means controlled by the movement of the carriage for alternately positioning the sludge scraping means so that one section is scraped of sludge during travel of the carriage in one direction and the adjacent section is scraped of sludge during travel of the carriage in the opposite direction.

15. A device of the class described comprising, in combination, a tank having a bottom composed of a plurality of juxtaposed inclined sections with a trough common to each pair of said sections, a carriage movable back and forth over the tank, and sludge removing means carried by the carriage, said sludge removing means comprising suction means movable over said trough, and a plurality of sludge-scraping means, each adapted for operative and inoperative movement over the inclined bottom sections whereby the sludge is scraped from only one section during movement of the carriage in one direction, and means controlled by the movement of the carriage for selectively positioning the sludge-scraping means so that the sludge is alternately scraped from said sections.

16. A device of the class described comprising, in combination, a tank having a bottom formed with a plurality of juxtaposed inclined sections with a trough common to each pair of said sections for receiving sludge scraped from the sections, a carriage movable back and forth over the tank, and sludge removing means carried by the carriage, said sludge removing means comprising suction means movable over the trough for substantially continuous withdrawal of the sludge therefrom, and a plurality of sludge-scraping means, each adapted for operative and inoperative movement over the inclined bottom sections whereby the sludge is scraped from only one section during movement of the carriage in one direction, and means for positioning the sludge-scraping means so that the sludge is scraped from one section during travel of the carriage in one direction and is scraped from an adjacent section during travel of the carriage in the opposite direction.

17. A device of the class described comprising, in combination, a tank having a bottom composed of a plurality of inclined sections with a trough common to each pair of sections, a carriage movable back and forth over the tank, and sludge scraping means for scraping sludge from said sections and into the trough, comprising blades suspended from the carriage and disposed transversely over each section, each of said blades being rotatable in one direction only, and means for periodically rotating the blades to successively bring the blades into operative and inoperative positions.

18. A device of the class described comprising, in combination, a tank having a bottom composed of a pair of inclined sections with a trough along the adjacent edges of said sections, a carriage movable back and forth over the tank, and sludge scraping means for scraping sludge from said sections and into the trough, comprising a pair of rotatable blades, each being mounted transversely over a section of the tank bottom, said blades being rotatable step by step in opposite directions and being movable successively into and out of operative positions, and mechanism carried by the carriage for selectively rotating the blades through predetermined arcs.

19. A device of the class described comprising, in combination, a tank having a bottom composed of a pair of inclined sections with a trough along the adjacent edges of said sections, a carriage movable back and forth over the tank, sludge scraping means for scraping sludge from said sections and into the trough comprising a pair of rotatable blades, each blade being mounted transversely over a section of the tank bottom, said blades being independently rotatable step by step in one direction only and movable successively into and out of operative position, means carried by the carriage for operating the blades, and means controlled by the movement of the carriage for controlling said blade operating means whereby the blades are alternately operatively positioned so that one section is scraped of sludge during travel of the carriage in one direction and the adjacent section is scraped of sludge during travel of the carriage in the opposite direction.

HARLOWE HARDINGE.